United States Patent
Fisk

[15] 3,663,190
[45] May 16, 1972

[54] GAUGE SUPPORT

[72] Inventor: James C. Fisk, G-3219 East Bristol Rd., Flint, Mich. 48507

[22] Filed: Apr. 22, 1970

[21] Appl. No.: 30,813

[52] U.S. Cl. .................................................... 51/165.74
[51] Int. Cl. ........................................................ B24b 49/04
[58] Field of Search .......................................... 51/165.74

[56] References Cited

UNITED STATES PATENTS 2,909,873  10/1959  Fisk .................................... 51/165.74
3,352,022  11/1967  Fisk .................................. 51/165.74 X

*Primary Examiner*—Lester M. Swingle
*Attorney*—Burton and Parker

[57] ABSTRACT

A gauge support or mounting for a gauge which automatically puts the gauge on and removes the gauge from successive workpieces in synchronous relation with the operations of a machine tool on the workpieces. The gauge is held continuously on the workpiece during the grinding or other operation to continuously indicate the progress of such operation. At the conclusion of the machine operation on the workpiece, the machine tool is retracted from the workpiece and the gauge is simultaneously withdrawn from engagement with the workpiece. When a new workpiece is inserted in position on the machine, the tool is shifted into working contact with the workpiece, and the gauge is simultaneously moved into gauging engagement with the workpiece. The movement of the gauge on the support or mounting toward and away from the workpiece is accomplished automatically and in response to the corresponding movements of the machine tool.

13 Claims, 5 Drawing Figures

INVENTOR.
JAMES C. FISK
BY Burton & Parker
ATTORNEYS

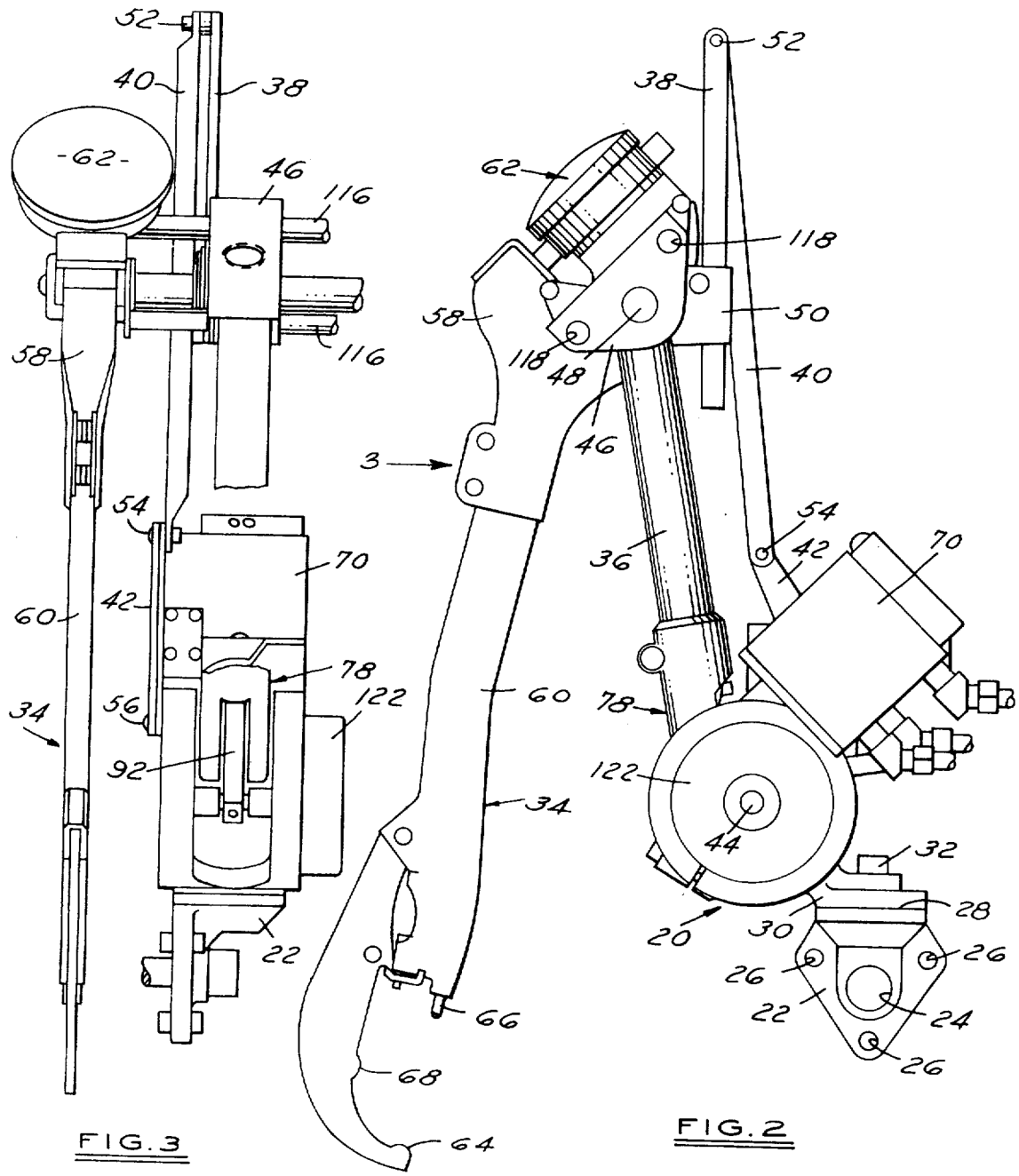

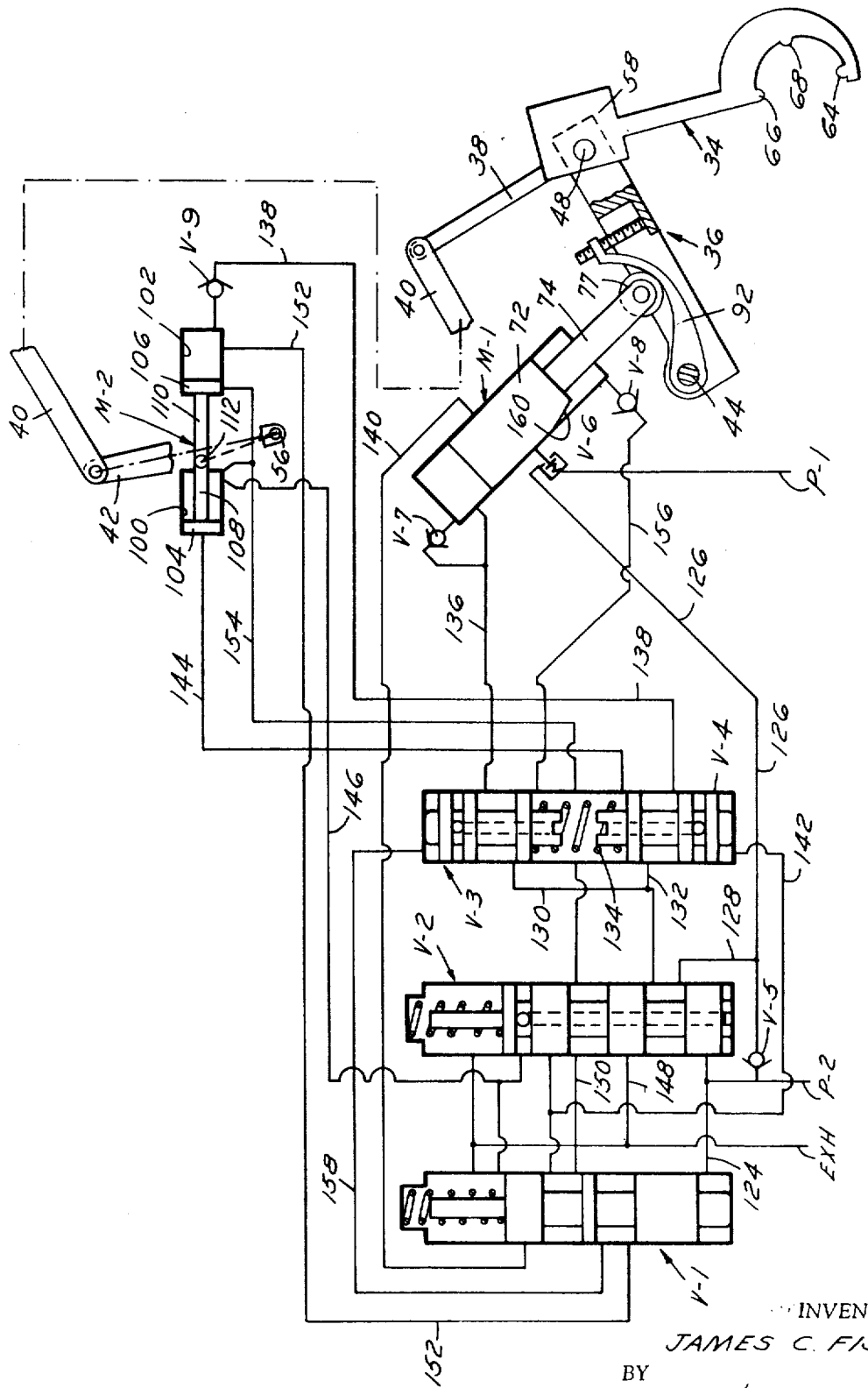

3,663,190

1
GAUGE SUPPORT

BACKGROUND OF THE INVENTION

The invention lies in the general field of gauges and supporting or mounting means therefor, and more particularly relates to a support for what is commonly termed an Upright Grinding Gauge used to continuously measure the diameter of a workpiece while it is being ground on a conventional grinding machine. A gauge of the character contemplated for use with the device of the instant invention is disclosed in my prior U.S. Pat. No. 3,352,022. Such a gauge is in gauging contact with the workpiece to indicate the process of the grinding operation, and comprises an elongate body portion having a lower end portion shaped to define a C-shaped hook for embracing a workpiece, the hook including a fixed contact and a movable contact engaging diametrically opposed points on the workpiece surface. The upper end of the gauge is provided with means upon which is mounted a dial indicator for ready observation of the operation by the machine operator.

After the grinding operation is completed, the grinding wheel is retracted from the workpiece, and the gauge is swung away from workpiece contact to permit removal of the workpiece from the machine. When another workpiece has been inserted in position to be ground the gauge is moved into gauging contact therewith and the grinding wheel is shifted against the workpiece to start another operation. The movement of the grinding wheel toward and away from the workpiece is accomplished by drive means internal to the machine. In the past, the gauge has been pivotally mounted on a stationary part of the machine, and the operator shifted the gauge manually into and out of engagement with the workpiece.

In my prior U.S. Pat. No. 2,909,873 there is shown a gauge support for a gauge of the character above described, including means for automatically shifting the gauge to and from the workpiece in timed relation to the movement of the grinding wheel into and out of grinding contact. The instant invention is an improvement on the development shown in such patent, and is particularly directed toward the provision of a more simple and foolproof mechanism which is capable of reliable operation in a production environment.

SUMMARY OF THE INVENTION

A gauge support for a machine tool comprising an arm swingably connected to the machine and supporting the gauge at its outer end, motor means mounted for engagement with the arm to shift the arm carrying the gauge toward a working position, and spring means biasing the arm in a direction tending to swing it and the gauge away from the workpiece to an at rest position, the arm having means for adjusting the relative position between the arm and machine at opposite extremities of motor means travel.

A primary object of the invention is the provision of a gauge support upon which a gauge may be mounted for movement toward and away from a workpiece in a machine tool, the support having means for automatically shifting the gauge in its movement in timed relation with the movement of the machine tool, and including an adjustability feature for conveniently changing the angular relationship between the gauge body and the machine.

Other objects, advantages and meritorious features will more fully appear from the following specification, claims and accompanying drawings, wherein:

FIG. 2 is a side elevation similar to FIG. 1 showing the gauge in its at rest position;

FIG. 3 is an end elevation taken in the direction of the arrow 3 in FIG. 2;

FIG. 5 is a schematic representation of the fluid pressure system for controlling the movement of the gauge support.

2

Figures 1, 4:
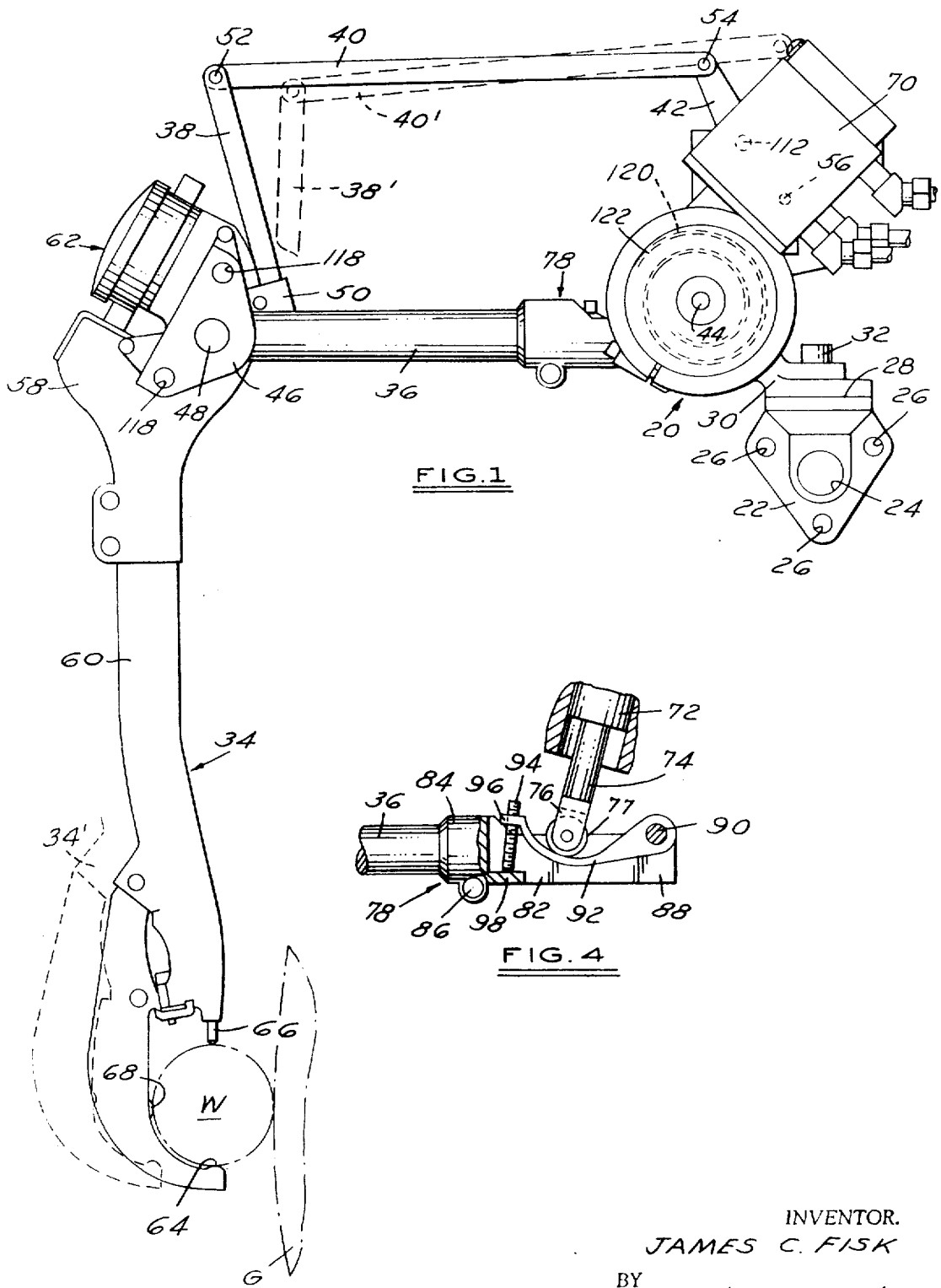
FIG. 1 is a side elevation of a gauge support embodying the invention, together with an upright grinding gauge mounted on the support, showing the gauge in workpiece engaging position.
FIG. 4 is a partial elevation showing the details of construction of the support arm — motor means coupling.

Turning now to a more particular examination of the drawings, there is shown in FIG. 1 a workpiece W in engagement with a grinding wheel G, which is a part of a conventional grinding machine. The machine itself has not been shown, as it is of well known construction and itself forms no part of the instant invention. The workpiece W is mounted on a part of the machine for rotation in a preselected relationship to the grinding wheel G. Also provided in the machine is means for rotating the grinding wheel at high speed, and a slide upon which the wheel is supported, the slide being connected to a fluid pressure motor operable to shift the wheel toward and away from the workpiece. Generally the initial movement of the wheel G toward workpiece W is at a rapid rate, and when closely adjacent the workpiece, wheel traverse is slowed to gently and accurately contact the work. Wheel traverse away from the workpiece is rapid throughout its movement.

Mounted on a stationary part of the grinding machine is a gauge support assembly generally indicated at 20 which includes a mounting bracket 22 having a central aperture 24 therethrough for securing the support assembly 20 to the machine as by means of a bolt or the like extending through the aperture and threaded into a part of the machine. Spaced around aperture 24 are a plurality of smaller threaded apertures 26, in this case three, for accommodating screws or the like which project into engagement with a surface on the machine and may be threadedly adjusted to dispose the bracket 22 and thus the entire support assembly 20 in exact predetermined position with respect to the grinding wheel G.

The upper end of bracket 22 is provided with a generally horizontally disposed flat face 28 atop which is positioned a mounting body 30 having a corresponding surface engaging face 28. Body 30 is secured to bracket 22 by means of a screw or the like 32 threaded into the bracket, and by loosening the screw 32, the body may be rotatably adjusted with respect to the bracket. A gauge 34, commonly referred to as an upright grinding gauge, is mounted on the body 30 by four generally trapezoidally arranged arms 36, 38, 40 and 42, as shown in FIG. 1. Member 36 may be termed a supporting arm, as it carries at its outer end mechanism to which the gauge is coupled, while member 38 will be referred to as a swing post, member 40 as a swing link, and member 42 as a swing lever.

Supporting arm 36 is pivotally connected to body 30 at one end on an axis shown at 44 in FIG. 1, and is pivotally connected at its opposite end to a generally U shaped gauge mounting bracket 46 at 48. Bracket 46 includes a projecting ear portion 50 defining a clevis-like friction clutch for securing swing post 38 to the bracket, and such arrangement permits the post to be longitudinally adjustable with respect to the bracket, for a purpose which will be further explained later. Swing link 40 is pivoted at opposite ends to post 38 and lever 42 on pivots 52 and 54 respectively, while the end of swing lever 42 opposite its connection with link 40 is pivoted to body 30 as shown at 56.

The gauge 34 shown in the drawings is of the type and construction shown in my prior U.S. Pat. No. 3,352,022, and generally includes a head portion 58 and an elongate body portion 60 rigidly telescoped together. The head portion 58 supports a dial indicator 62 having its dial face disposed upwardly and forwardly for easy reading by a workman. The lower end of the gauge is shaped to define a caliper means including a fixed contact 64 and a movable contact 66 engaging the workpiece at diametrically opposite points to measure workpiece diameter, and another fixed locating contact 68 which serves to position the workpiece properly between contacts 64 and 66. Movable contact 66 is coupled through mechanism inside the gauge body to the dial indicator 62 to provide a continuous workpiece diameter reading throughout the grinding operation.

The linkage upon which the gauge 34 is mounted, comprising the members 36, 38, 40 and 42, is actuated to shift the gauge from its operative position shown in FIG. 1 to its at rest position shown in FIG. 2 through fluid pressure operated motive means mounted on the body 30. Basically, the motive means comprises a pair of fluid pressure operated motors, associated valves, and fluid passages contained within a manifold block 70, which parts are shown schematically in FIG. 5, and will be described as to functional operation hereinafter.

Manifold block 70 is removably mounted on the body 30 and is provided with porting and internal passageways to deliver fluid under pressure to the various valves and motors which are also disposed therein. Three fluid pressure lines are connected through suitable fittings as shown to manifold block 70, and furnish fluid supply and exhaust thereto, as set forth in detail later. A first reciprocable fluid pressure motor M-1 in manifold 70 (FIGS. 4 and 5) has a piston 72 connected to a piston rod 74 (FIGS. 4 and 5) with the piston rod having a clevis-shaped extremity 76 to rotatably support a roller 77. At the end of rod 36 opposite its connection to gauge 34, there is fixedly mounted a rotor assembly 78, which is an extension of the rod and is pivotally coupled to body 30 on the axis 44. Assembly 78 includes a support 82 having a split sleeve 84 at one end rigidly clamped to rod 36 by a screw 86, and a pair of parallel extensions at its opposite end, one of which is shown at 88 in FIG. 4. A pivot pin 90 extending between the extensions serves to support one end of a curved cam member 92, the opposite end of which is adjustable with respect to the support 82 by a threaded rod 94 extending through the free end 96 of the cam which bears against a shelf-like portion 98 of the support. A light spring (not shown) may be utilized to urge cam 92 in a direction to maintain contact between rod 94 and portion 98 of the support. Because of its configuration and location with respect to the axis of the piston rod 74 and arm 36, angular repositioning of cam 92 by means of adjusting screw 94 changes the angular position of arm 36, and hence the position of gauge 34, at a given position in the travel of the fluid pressure motor M-1 as defined by roller 77.

A second fluid pressure operated reciprocable motor M-2 is located within manifold block 70 and includes two axially aligned cylinders 100 and 102 each having a piston 104 and 106 with a piston rod 108 and 110 connected to the pistons and projecting toward each other coaxially and spaced apart at their inner ends a predetermined distance. Intermediate its opposite ends, swing lever 42 has a laterally projecting pin 112 engaged in a slot (not shown) cut in manifold block 70. Alternate pressurization of cylinders 100 and 102 causes shifting of pistons 104 and 106 to move piston rods 108 and 110 into engagement with pin 112 to swing the lever 42 about its point of pivotal connection shown at 56, as further explained herebelow. The manifold block 70, which contains all of the fluid pressure controls, may be secured to body or bracket 30 as by screws or the like, and by removing such screws and disconnecting the fluid pressure liners leading to the block, it may be conveniently removed and replaced in the event of damage or malfunction.

As depicted in FIG. 3 most clearly, gauge 34 is positioned laterally offset the structure of the supporting mechanism above described, and is coupled to bracket 46 by means of a plurality of rods or the like 116 connected to the gauge head portion 58 at one end and projecting through suitable apertures 118 in the bracket to permit lateral adjustment of the gauge 34 relative to the support 20 in order to exactly align the calipers at the lower end of the gauge with the workpiece being ground.

Referring back to FIG. 1, it can be seen that when the gauge 34 is in its operative position engaging workpiece W, which is in contact with grinding wheel G, support arm 36 is in a substantially horizontal position. In this orientation of the parts, piston rod 74 of motor M-1 is extended and bears against cam 92, holding the assembly in the arrangement illustrated in FIG. 1. In order to maintain fixed contact 64 at the lower end of the gauge in firm contact with the workpiece W, there is provided a flat, helically wound spring 120 having one end connected to the shaft 44 upon which arm 36 is mounted, and the other end connected to a portion of the body 30. Housing 122 covers spring 120 to prevent contaminants from getting into it. Spring 120 exerts a clockwise bias on shaft 44 as shown in FIG. 1, tending to rotate arm 36 in a clockwise direction, which bias is transmitted through the gauge 34 to urge stationary contact 64 generally upwardly into firm contact with workpiece W. In addition, spring 120 serves to provide the force necessary to pivot the assembly and shift the gauge 34 from its operative position shown in FIG. 1 to its inoperative or at rest position shown in FIGS. 2 and 3 when the motor is reversed to retract piston rod 74.

Referring now more particularly to FIG. 5, the mechanical structure of the device shown schematically therein has been reversed from the showing in FIGS. 1 and 2, and a portion of the swing linkage and motor M-2 has been displaced to make the schematic more easily understandable. The operation of the mechanism will now be described with primary emphasis on FIG. 5 and with reference to the remaining Figures of the drawings where necessary to make the description complete. The directions of movement of the various parts of the device will all be made with reference to FIG. 5, however.

The movement of the gauge 34 between its at rest and operative positions is essentially a two phase movement, wherein during the major portion of its travel the gauge is swung about pivot point 44 by motor M-1 and/or spring 120, depending upon the direction of movement, and during a minor part of the travel, i.e., in the immediate area of the workpiece W, the gauge is swung about pivot 48 by motor M-2. In FIG. 5 the gauge 34 is shown in an intermediate position between opposite extremities of its travel.

An hydraulic system will be assumed in the following discussion, and has been used in practice because such is generally used in the industry in grinding machine control, although it will be apparent to those skilled in the art that other types of motivation for the structure might be employed. Shown in FIG. 5 along the lower edge thereof are three lines, labelled EXH., which is an exhaust line; P-2, which is a pressure line coupled to the pressure line of the grinding machine which provides power to shift the grinding wheel G toward the workpiece W (FIG. 1); and P-1, which is connected to a source of fluid under a constant pressure. Line P-1 is pressurized at all times, while line P-2 is pressurized only during the interval that the grinding wheel control cylinder (not shown) is also pressurized to move the wheel toward the workpiece and maintain it in contact with the workpiece during the actual grinding operation, then is connected to exhaust as grinding wheel G is retracted.

Also shown schematically in FIG. 5 are the valve means for controlling the flow of fluid pressure to the motors M-1 and M-2. Such valves are positioned within the manifold block 70, but are not shown in FIGS. 1-3 in the interest of clarity. The valve identified as V-1 in FIG. 5 is the primary coordination valve for coordinating the gauge and grinding machine functions. Valve V-2 is the working coordination valve. Valves V-3 and V-4 are the reversing valves for motors M-1 and M-2 respectively, and these two valves are axially opposed and biased by a common spring toward opposite ends of the valve housing, as shown. V-5 is a ball check valve, while V-6 is a poppet valve which is held closed by a spring and mechanically opened by piston 72 of motor M-1. Valves V-7 and V-8 are throttle check valves controlling the exhaust at opposite ends of motor M-1, and V-9 is a similar valve controlling exhaust from one end of motor M-2.

Assuming that the gauge and support are in the at rest or "park" position shown in FIG. 2, and that the grinding machine control has been actuated to shift the grinding wheel toward a workpiece positioned in the machine for grinding, pressurization of the hydraulic motor on the machine to move the wheel will also pressurize line P-2. This pressurizes line 124 to shift valve V-1 from the position shown to the opposite end of its stroke, and also admits pressure fluid through check valve V-5, and lines 126 and 128 to valve V-2, which is spring biased to the position shown and passes the fluid through lines 130 and 132 to valves V-3 and V-4 respectively. As these two valves are biased by spring 134 to the positions shown, both valves are open to the passage of fluid therethrough, and lines 136 and 138 are thereby pressurized to supply fluid to the upper end of motor M–1 and the right-hand end of cylinder 102 of motor M–2 respectively.

Pressurization of motor M–1 shifts piston 72, extending piston rod 74 to pivot arm 36, swinging the arm and gauge 34 about pivot 44 from the position shown in FIG. 2 to the position shown in dotted outline at 34′ in FIG. 1. During this interval, pressurization of the right-hand end of cylinder 102 of motor M–2 has retained swing lever 42 in its position shown in FIG. 5, and therefore when motor M–1 has completed its travel, the swing linkage members 38 and 40 are in their positions shown in dotted outline in FIG. 1 at 38′ and 40′ (the link 42 in this position lying behind manifold block 70), and the gauge is in its position immediately adjacent the workpiece W as shown at 34′.

At the completion of its travel downwardly as shown in FIG. 5, the piston 72 of motor M–1 passes the entry port of line 140 to the cylinder, thereby establishing communication between line 140 and already pressurized line 136. As valve V–1 has previously been shifted by pressure in line 124, fluid passes from line 140 through such valve into line 142, which acts against valve V–4 to shift it against the bias of spring 134. When valve V–4 shifts, communication is established through it between line 132 and line 144, which pressurizes the left-hand end of cylinder 100 to shift piston 104 and piston rod 108 to pivot swing lever 42 clockwise as shown in FIG. 5, which is counterclockwise as shown in FIG. 1. This shifts the members 38 and 40 (and also link 42, obscured by manifold block 70) from their dotted outline positions as shown in FIG. 1 to their solid outline positions, in turn swinging the gauge into operative position with its caliper engaging workpiece W.

An important feature of the construction shown is that when piston 104 reaches the extreme right-hand end of its stroke, it uncovers the port of line 146 which communicates with valve V–2. This serves to shift the valve against its spring, establishing communication from pressure line P–2 to the end actuator of the valve, shifting the valve all the way, thereby blocking line 146 and blocking line 128, while at the same time connecting lines 130 and 132 to exhaust line EXH, through line 148. This exhausts all motor functions of both motors M–1 and M–2 as well as valves V–3 and V–4, and isolates fluid pressure supplied through pressure line P–2 from all the system components except the actuators of valves V–1 and V–2, which are both retained in their actuated or "up" position as viewed in FIG. 5, valve V–2 then being supplied through line 124. With pressure removed from motor M–1, spring 120 acts on arm 36 (see FIG. 1), and this force is transmitted through the gauge 34 to maintain intimate contact of stationary contact 64 with workpiece W to insure maximum accuracy of the reading on dial indicator 62 as measured by contacts 64 and 66. Lines 136, 140 and 156 from motor M–1 are all connected to exhaust, as are lines 138, 144, 152 and 154 from motor M–2 through line 150.

When the grinding operation is complete, pressure is removed from the grinding machine control cylinder which advances the grinding wheel toward the workpiece and maintains it in contact therewith, which also depressurizes line P–2 of FIG. 5. The grinding wheel is then retracted from the workpiece by the machine control. Depressurization of line P–2 removes pressure against valves V–1 and V–2, and they therefore are spring returned to their normal positions shown in FIG. 5. As line P–1 has been supplied with fluid at constant pressure throughout, removal of pressure from line P–2 permits line 126 to be pressurized from pressure line P–1 through valve V–6, previously opened by downward movement of piston 72 of motor M–1, thereby pressurizing line 136 via line 130 and line 138 via line 132. Pressurization of line 136 maintains piston rod 74 of motor M–1 in its fully extended position, while pressure in line 138 drives piston 106 in cylinder 102 to pivot swing lever about pivot 56, indexing gauge 34 away from the workpiece W to its position shown in dotted outline at 34′ in FIG. 1. As piston 106 moves, it exposes the port in its cylinder 102 connected to line 152, thus pressurizing such line thereby pressurizing line 158 through valve V–1 to actuate valve V–3, shifting it down as viewed in FIG. 5. When valve V–3 shifts, communication is established between line 130 and line 156, supplying pressure to the lower end of motor M–1, thereby retracting piston rod 74 and permitting gauge 34 to be raised to its "park" position shown in FIG. 2 by spring 120. At the extremity of its travel, piston 72, by virtue of its undercut 160, releases spring loaded valve V–6, and the valve closes, interrupting communication between pressure line P–1 and line 126. The system is now at rest in the position depicted in FIG. 3, in condition for initiation of another cycle of operation.

It should be noted that the so-called throttle valves V–7, V–8 and V–9 perform an important function during the operation of motors M–1 and M–2. Each of these valves is constructed to permit unrestricted flow into its respective cylinder end but to restrict or throttle the flow out of the cylinder. Thus during movement of piston 72 of motor M–1 in either direction, valve V–7 or V–8 operates to restrict flow from that end of the cylinder which is connected to exhaust, thus governing the velocity of gauge movement to prevent damage to the delicate mechanism. Likewise, valve V–9 retards the speed of motor M–2 as it shifts the gauge into contact with the workpiece to prevent a sharp blow to the movable contact 66, which could result in damage to the dial indicator 62. The opposite end of motor M–2 does not require this feature, as there is virtually no possibility of injuring the parts as the gauge is indexed away from the workpiece.

The friction clutch connection between the swing post 38 and gauge mounting bracket 46 permits quick and convenient adjustment of the angular gauge position. Further, in the event of any miscoordination during operation of the gauge support, damage to the gauge and/or the support linkage is effectively prevented, because the connection will slip with the application of force thereagainst caused by malfunction before the force reaches a level that could damage the mechanism.

I claim:

1. A gauge support for a machine tool having a tool engageable with a workpiece, comprising: an elongate arm pivotally connectable to the machine tool adjacent one end thereof and supporting a gauge at its opposite end for swingable movement toward and away from said workpiece, fluid pressure operated motor means to swing the arm toward the workpiece, said motor means including a cylinder and piston having a piston rod projecting into engagement with the arm to shift the same upon extension of the piston rod, and spring means coupled with the arm biasing it to a position away from the workpiece.

2. The gauge support as defined in claim 1 characterized in that said motor means comprises a double acting cylinder and piston with its piston rod extensible to shift said arm and retractable to permit return of the arm under the force of said spring means.

3. The gauge support as defined in claim 1 characterized in that cam means is positioned on said arm, and said piston rod carries a roller at its outer end engaging said cam means to shift the arm toward a workpiece.

4. The gauge support as defined in claim 3 characterized in that said cam means is adjustable with respect to said arm for varying the relative positions of said arm and piston rod when the motor means is at its limits of travel.

5. The gauge support as defined in claim 4 characterized in that said cam means comprises an elongate cam member pivotally connected at one end to said arm having adjustable stop means at its opposite end for selectively varying the position of the cam member with respect to the arm.

6. The gauge support as defined in claim 1 characterized in that said fluid pressure cylinder includes adjustable throttle valve means coupled thereto for selectively varying the rate of fluid flow to thereby vary the rate of movement of said arm.

7. An automatic gauge support for a machine tool having workpiece holding means and a tool shiftable into and out of engagement with the workpiece, comprising: a bracket adapted to be fixedly mounted on the machine tool, an arm pivotally coupled to said bracket at one end and having means at its opposite end for swingably supporting a gauge, cam means adjustably mounted on said arm intermediate its ends, a fluid pressure operated motor including a cylinder and piston having a piston rod projecting into engagement with said cam means for shifting the arm between an at rest position remote the workpiece and a working position adjacent the workpiece upon actuation of said fluid pressure operated motor, a gauge supported at said opposite end of said arm, linkage means connected between said bracket and said gauge supporting means, motor means operatively coupled to said linkage means for indexing said gauge between workpiece engaging and disengaging positions, and spring means coupled with the arm biasing it to said at rest position.

8. The gauge support as defined in claim 7 characterized in that said cam means comprises an elongate cam member adjustably mounted on said arm having a concave cam surface extending generally axially of said arm, and said piston rod having a roller rotatably mounted at its free end for engagement with said cam surface on the cam member for shifting the arm upon actuation of said fluid pressure operated motor.

9. The gauge support as defined in claim 8 characterized in that said cam member is pivotally mounted at one end on said arm and has a free end, with adjustable stop means extending between said free end of the cam member and the arm to selectively vary the angular relationship between the cam member and the arm, and spring means coupled to the cam member biasing it toward the arm.

10. The gauge support as defined in claim 7 characterized in that said motor means operatively coupled to said linkage means for swinging said gauge comprises a pair of axially opposed fluid pressure operated motors each including a cylinder and piston, and having a projecting piston rod, with said piston rods being selectively engageable with a part on said linkage means to shift the part in opposite directions, thereby indexing the gauge between said workpiece engaging and disengaging positions.

11. A machine tool and gauge support therefor, wherein the machine tool has workpiece holding means and a tool shiftable into and out of engagement with said workpiece, comprising: a bracket fixedly mounted on the machine tool, an arm pivotally coupled to said bracket at one end and having means at its opposite end for swingably supporting a gauge, cam means adjustably mounted on said arm intermediate its ends, a fluid pressure motor having a piston rod projecting into engagement with said cam means for shifting the arm between and at rest position remote the workpiece and a working position adjacent the workpiece upon actuation of said fluid pressure motor, a gauge supported at said opposite end of said arm, linkage means connected between said bracket and said gauge supporting means, a second motor operatively coupled to said linkage means for indexing said gauge between workpiece engaging and disengaging positions, biasing means coupled with the arm biasing it to said at rest position, and control means connected to said machine tool and to both of said motors and including means for sequentially governing the operation of both of said motors in timed relationship with the operation of said machine tool.

12. The machine tool and gauge support therefor as defined in claim 11 characterized in that said control means comprises fluid pressure operated valve means coupled to said motors and to said machine tool and actuatable in response to machine tool fluid pressure control variations to sequentially actuate said motors.

13. The machine tool and gauge support therefor as defined in claim 12 characterized in that said control means comprises a self-contained manifold block having fluid conducting passageways and ports therein, with said fluid pressure operated valves disposed within the block, said manifold block being removably mounted on said bracket.

* * * * *